(12) United States Patent
Kim et al.

(10) Patent No.: US 9,843,242 B2
(45) Date of Patent: *Dec. 12, 2017

(54) ANTI-SEPARATING STRUCTURE OF SENSING MAGNET FOR EPS MOTOR

(75) Inventors: Taehwan Kim, Seoul (KR); Shunghun Woo, Seoul (KR); Donggeun Chang, Seoul (KR); Byungyong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 755 days.

This patent is subject to a terminal disclaimer.

(21) Appl. No.: 13/552,226

(22) Filed: Jul. 18, 2012

(65) Prior Publication Data

US 2013/0020916 A1 Jan. 24, 2013

(30) Foreign Application Priority Data

Jul. 22, 2011 (KR) ........................ 10-2011-0072976
Jul. 25, 2011 (KR) ........................ 10-2011-0073666

(Continued)

(51) Int. Cl.
*H02K 11/00* (2016.01)
*H02K 11/215* (2016.01)
(Continued)

(52) U.S. Cl.
CPC ........... *H02K 11/215* (2016.01); *G01D 5/142* (2013.01); *G01D 5/20* (2013.01); *H02K 1/28* (2013.01);
(Continued)

(58) Field of Classification Search
CPC ...... H02K 5/22; H02K 5/225; H02K 11/0015; H02K 11/0021; H02K 11/001;
(Continued)

(56) References Cited

U.S. PATENT DOCUMENTS 4,260,920 A * 4/1981 Nakamura et al. ...... 310/156.05
4,339,875 A * 7/1982 Muller .................. G01R 33/00
29/596

(Continued)

FOREIGN PATENT DOCUMENTS

CN 201060654 Y 5/2008
EP 2141758 A2 1/2010

(Continued)

OTHER PUBLICATIONS

Definition of Screw, Dictionary, Obtained Mar. 4, 2015, 'http://dictionary.reference.com/browse/screw?s=t'.*

(Continued)

*Primary Examiner* — Bernard Rojas
*Assistant Examiner* — Rashad Johnson
(74) *Attorney, Agent, or Firm* — Saliwanchik, Lloyd & Eisenschenk

(57) ABSTRACT

Disclosed is an anti-separating structure of a sensing magnet for EPS motor, the structure being a coupling structure between the sensing magnet and a plate of the EPS motor, the structure including a disk-shaped plate formed with a magnet accommodation unit protrusively formed near at a rotation shaft, a ring-shaped sensing magnet centrally formed with a through hole having a diameter corresponding to the magnet accommodation unit, and magnet grip units each formed at a predetermined gap along a circumferential surface of the magnet accommodation unit.

15 Claims, 13 Drawing Sheets

(30) Foreign Application Priority Data

Jul. 25, 2011 (KR) ........................ 10-2011-0073667
Aug. 16, 2011 (KR) ........................ 10-2011-0081038

(51) Int. Cl.
*H02K 29/08* (2006.01)
*H02K 1/28* (2006.01)
*G01D 5/20* (2006.01)
*G01D 5/14* (2006.01)
*H02K 11/21* (2016.01)
*H02K 5/22* (2006.01)

(52) U.S. Cl.
CPC ............... *H02K 29/08* (2013.01); *H02K 5/22* (2013.01); *H02K 5/225* (2013.01); *H02K 11/21* (2016.01)

(58) Field of Classification Search
CPC .... H02K 11/0031; H02K 29/03; H02K 29/06; H02K 29/08; G01D 5/142; G01D 5/20
USPC .............. 310/60 R, 66, 68 B, 68 D, 68 R, 71
See application file for complete search history.

(56) References Cited

U.S. PATENT DOCUMENTS

| | | | | |
|---|---|---|---|---|
| 8,237,318 | B2* | 8/2012 | Ikitake et al. | 310/68 B |
| 2003/0201692 | A1* | 10/2003 | Chen | H02K 1/2793 310/268 |
| 2006/0202574 | A1* | 9/2006 | Nayak | G11B 15/26 310/68 B |
| 2006/0250127 | A1* | 11/2006 | Kayao | G01D 5/14 324/207.22 |
| 2007/0029995 | A1* | 2/2007 | Ichiman | 324/174 |
| 2007/0273362 | A1* | 11/2007 | Nakajima et al. | 324/174 |
| 2008/0170377 | A1* | 7/2008 | Miyasaka | H01H 19/005 361/781 |
| 2008/0211332 | A1* | 9/2008 | Kataoka | H02K 3/522 310/71 |
| 2008/0211357 | A1* | 9/2008 | Kataoka | H02K 11/0021 310/68 B |
| 2008/0252286 | A1* | 10/2008 | Kottmyer et al. | 324/207.25 |
| 2010/0289442 | A1* | 11/2010 | Hatano et al. | 318/400.38 |
| 2011/0181221 | A1 | 7/2011 | Asahi et al. | |
| 2012/0091830 | A1* | 4/2012 | Kim | H02K 11/0021 310/43 |
| 2014/0035444 | A1* | 2/2014 | Jung | H02K 11/215 310/68 B |
| 2014/0167572 | A1* | 6/2014 | Woo | H02K 11/0021 310/68 B |
| 2014/0167743 | A1* | 6/2014 | Park | G01D 5/145 324/207.2 |

FOREIGN PATENT DOCUMENTS

| | | |
|---|---|---|
| EP | 2439835 A2 | 4/2012 |
| EP | 2689519 A1 | 1/2014 |
| JP | 2000180113 A | 6/2000 |
| JP | 2010-93869 A | 4/2010 |
| JP | 2010249519 A | 11/2010 |
| JP | 2010276403 A | 12/2010 |
| JP | 2011095180 A | 5/2011 |
| KR | 10-2009-0050650 A | 5/2009 |
| KR | 10-1018105 B1 | 2/2011 |
| KR | 10-2011-0038234 A | 4/2011 |

OTHER PUBLICATIONS

Hiroshi et al., English Machine Translation of JP 2010-249519, Nov. 4, 2010.*
Office Action dated Oct. 28, 2015 in Chinese Application No. 201210257085.2.
Office Action dated Jul. 13, 2017 in Korean Application No. 10-2011-0072976.
Office Action dated Jul. 13, 2017 in Korean Application No. 10-2011-0073667.
Office Action dated Jul. 13, 2017 in Korean Application No. 10-2011-0081038.
European Search Report in European Application No. 12168918.6.

* cited by examiner

20; # ANTI-SEPARATING STRUCTURE OF SENSING MAGNET FOR EPS MOTOR

CROSS-REFERENCE TO RELATED APPLICATIONS

This application claims the benefit under 35 U.S.C. §119 of Korean Patent Application Nos. 10-2011-0072976, filed Jul. 22, 2011, 10-2011-0073666, filed Jul. 25, 2011, 10-2011-0073667, filed Jul. 25, 2011, and 10-2011-0081038, filed Aug. 16, 2011, which are hereby incorporated by reference in their entirety.

BACKGROUND

Field of the Invention

The present disclosure relates to a coupling structure between a sensing magnet and a plate of an EPS motor.

Discussion of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque. The BLDC motor generally forms an exterior look by coupling of housing and a cover member, an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above.

The cover member is formed therein with a PCB (Printed Circuit Board) mounted with a sensing device provided in a magnetic device, where the sensing device detects a magnetic force of a sensing magnet rotatably mounted with the rotor, whereby a current position of the rotor can be checked. Generally, the sensing magnet is fixed to an upper surface of a plate mounted at an upper side of the rotor using an adhesive. In a case the sensing magnet is magnetized to the plate, the position of the rotor can be detected by coupling of the plate to the rotation shaft in response to a direction of magnetic field.

The coupling of the plate to the sensing magnet is performed using the adhesive as mentioned above. Thus, it is difficult to precisely control the adhesion process, and there is a possibility of the sensing magnet being separated. Particularly, in view of vehicular characteristics where environmental conditions vary, a coupling relation must be maintained by a coupling force of the adhesive alone, and if a motor is used under an alternating conditions of high temperature and low temperature, or exposed under a high temperature for a long time, the adhesive force of the adhesive may decrease to generate a separation of sensing magnet or a disablement of motor driving. This structure generates a difficulty in selecting a proper adhesive and an economical difficulty in selecting a high price adhesive, and poses a problem of requiring a further fine coating process of adhesive.

BRIEF SUMMARY

The present disclosure is directed to cope with the above-mentioned problems/disadvantages and it is an object of the present disclosure to provide an improved anti-separating structure of a sensing magnet for EPS motor, capable of inhibiting a sensing magnet from separating even in a case the sensing magnet is used under a high temperature for a long time or under a temperature severely-changing environment condition by improving a coupling structure between the sensing magnet and a plate.

Technical problems to be solved by the present disclosure are not restricted to the above-mentioned description, and any other technical problems not mentioned so far will be clearly appreciated from the following description by the skilled in the art.

In a general aspect of the present disclosure, there is provided an anti-separating structure of a sensing magnet for EPS motor, the structure being a coupling structure between the sensing magnet and a plate of the EPS motor, the structure comprising: a disk-shaped plate formed with a magnet accommodation unit protrusively formed near at a rotation shaft; a ring-shaped sensing magnet centrally formed with a through hole having a diameter corresponding to the magnet accommodation unit; and magnet grip units each formed at a predetermined gap along a circumferential surface of the magnet accommodation unit.

Preferably, but not necessarily, the plate is coated with an adhesive on a surface opposite to the sensing magnet.

Preferably, but not necessarily, an outmost diameter of the sensing magnet corresponds to a diameter of the plate.

Preferably, but not necessarily, the magnet grips are formed by caulking at a predetermined gap along a circumference of the magnet accommodation unit.

Preferably, but not necessarily, the magnet grips are formed by caulking a total of 12 positions of the circumference of the magnet accommodation unit at a 30-degree gap.

In another general aspect of the present disclosure, there is provided an anti-separating structure of a sensing magnet for EPS motor, the structure being a coupling structure between the sensing magnet and a plate of the EPS motor, the structure comprising: a disk-shaped plate centrally inserted by a rotation shaft; a ring-shaped sensing magnet having a through hole at a center coupled to an upper side of the plate; and magnet grips protruded toward the sensing magnet from the plate to grip the through hole of the sensing magnet.

Preferably, but not necessarily, the magnet grip includes a support rib protruded toward an upper side of the plate, and a separation inhibition unit surface-contacting an upper surface of the sensing magnet by bending a distal end of the support rib.

Preferably, but not necessarily, at least a pair of magnet grips is provided, each magnet grip being symmetrically arranged relative to a center of the plate to allow the support ribs to face each other.

Preferably, but not necessarily, an outmost diameter of the sensing magnet corresponds to a diameter of the plate.

Preferably, but not necessarily, the plate is coated with an adhesive on a surface opposite to the sensing magnet.

In still another general aspect of the present disclosure, there is provided an anti-separating structure of a sensing magnet for EPS motor, the structure being a coupling structure between the sensing magnet and a plate of the EPS motor, the structure comprising: a disk-shaped plate centrally inserted by a rotation shaft; a ring-shaped sensing magnet having a through hole at a center coupled to an upper side of the plate; a magnet support rib protruded from the plate toward sensing magnet to grip a first support surface of the through hole at the sensing magnet; a holder member coupled to an upper side of the sensing magnet to support a second support surface provided at an ambience of the first support surface; and a fixing unit fixing the holder member to the plate.

Preferably, but not necessarily, the fixing unit includes a fastening member coupled to a second through hole penetratively formed at the plate after passing through the first through hole penetratively formed at the holder member.

Preferably, but not necessarily, the fastening member includes any one of a screw or a rivet.

Preferably, but not necessarily, the fixing unit includes a hook integrally formed with the holder member and protrusively formed from the holder member toward the plate, and a hitching unit penetratively formed at a position corresponding to the hook of the plate.

Preferably, but not necessarily, the second support surface is protrusively formed horizontally across the first support surface toward a center of the sensing magnet.

Preferably, but not necessarily, the first and second support surfaces, each one pair and facing each other, are symmetrically formed based on the center of the sensing magnet.

Preferably, but not necessarily, the second support surface is formed with a slant surface of a predetermined area to allow surface-contacting a surface opposite to the holder member.

Preferably, but not necessarily, an outmost diameter of the sensing magnet corresponds to a diameter of the plate.

Preferably, but not necessarily, the plate is coated with an adhesive on a surface opposite to the sensing magnet.

In still another general aspect of the present disclosure, there is provided an anti-separating structure of a sensing magnet for EPS motor, the structure being a coupling structure between the sensing magnet and a plate of the EPS motor, the structure comprising: a disk-shaped plate centrally inserted by a rotation shaft; a ring-shaped sensing magnet having a through hole at a center coupled to an upper side of the plate, formed with a main magnet at a position near to a periphery and formed with a sub magnet at a position near to the through hole; a magnet support rib protruded from the plate toward sensing magnet to grip a first support surface of the through hole at the sensing magnet; a holder member coupled to an upper side of the sensing magnet to support a second support surface provided at an ambience of the first support surface; a fixing unit fixing the holder member to the plate; and an adhesive accommodation groove formed at a predetermined depth on a surface opposite to the plate of the sensing magnet and coated therein with an adhesive.

Preferably, but not necessarily, the fixing unit includes a fastening member coupled to a second through hole penetratively formed at the plate after passing through the first through hole penetratively formed at the holder member.

Preferably, but not necessarily, the fastening member includes any one of a screw or a rivet.

Preferably, but not necessarily, the adhesive accommodation groove is so arranged as to inhibit a formed position of the main magnet from interfering with a formed position of the sub magnet.

Preferably, but not necessarily, the adhesive accommodation groove is formed with a depth within 0.05 mm.

Preferably, but not necessarily, an outmost diameter of the sensing magnet corresponds to a diameter of the plate.

The anti-separating structure of sensing magnet for EPS motor according to the present disclosure has an advantageous effect in that a sensing magnet and a plate are physically formed and fixed using a plurality of caulking unit in addition to an adhesive, such that even if use environment of motor is inadequate, the sensing magnet and plate are inhibited from being separated to enhance a reliability of the motor.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
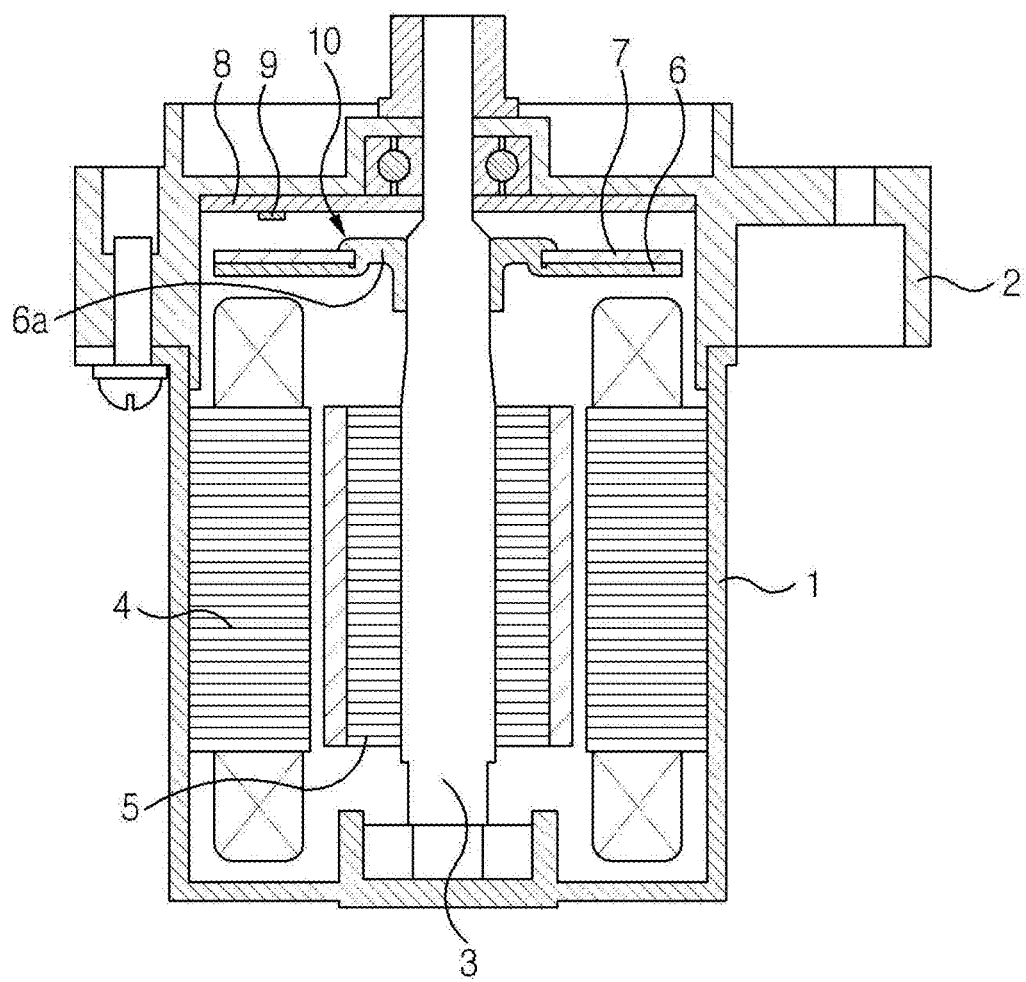
FIG. 1 is a schematic cross-sectional view of an EPS motor according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, anti-separating structure of a sensing magnet for EPS motor according to the exemplary embodiments of the present disclosure will be described in detail with reference to the accompanying drawings.

FIG. 1 is a schematic cross-sectional view of an EPS motor according to an exemplary embodiment of the present disclosure.

Referring to FIG. 1, the EPS motor according to the present disclosure includes a housing (1), and a cover member (2) coupled to an upper surface of the housing (1) to form a general exterior look of the EPS motor.

The housing (1) is formed at an inner circumferential surface with a stator (4) wound with a plurality of coils, and the stator (4) is centrally formed with a rotor (5) rotatable by a rotation shaft (3). A rotor core of the rotor (5) may be coupled with a magnet, or the rotor core and a magnet may be integrally formed. The rotor (5) is formed at an upper surface with a sensing magnet (7) coupled to a plate (6) for obtaining position information of the rotor (5).

The sensing magnet (7) is mounted at an upper surface thereof with a magnetic element (9) to face the sensing magnet (7). The magnetic element (9) is mounted on a PCB (Printed Circuit Board) fixed at an inner surface of the cover member (2). At this time, the magnetic element (9) is preferably provided in a Hall IC.

The characteristic of the present disclosure is a coupling relationship between the plate (6) and the sensing magnet (7), and configuration according to a first exemplary embodiment of the present disclosure is described with reference to FIGS. 2 and 3.

Figure 2:
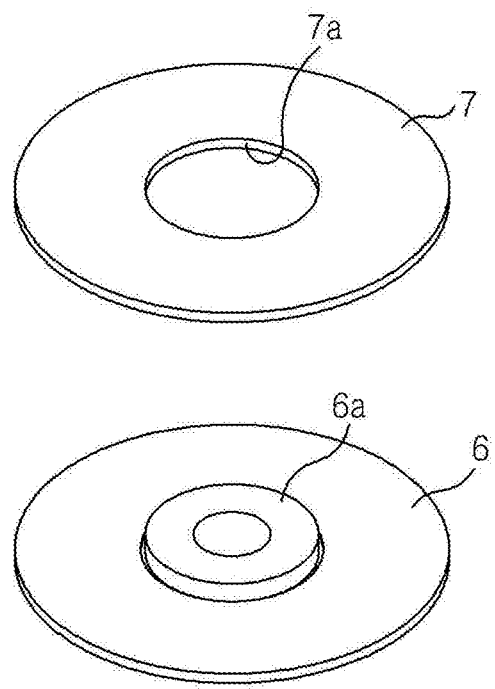
FIG. 2 is an exploded perspective view of a sensing magnet and a plate in FIG. 1 according to a first exemplary embodiment of the present disclosure.

The plate (6) according to the first exemplary embodiment of the present disclosure is provided in a disk shape, as shown in FIG. 2, and a central vicinity coupled to the rotation shaft (3) is protrusive formed with a magnet accommodation unit (6a) coupled by the sensing magnet (7).

The sensing magnet (7) is provided in a disk shape having an outmost diameter corresponding to a diameter of the plate (6), centrally formed with a through hole (7a) having a diameter corresponding to the magnet accommodation unit (6a), and the magnet accommodation unit (6a) may pass through the through hole (7a) to be coupled thereto.

Meanwhile, a surface opposite to the sensing magnet (7) of the plate (6) is coated with an adhesive to initially fix the plate (6) to the sensing magnet (7). In addition to the adhesive, the plate (6) and the sensing magnet (7) may be adhered using a film member having an adhesive component such as a double-sided tape, if necessary.

Figure 3:
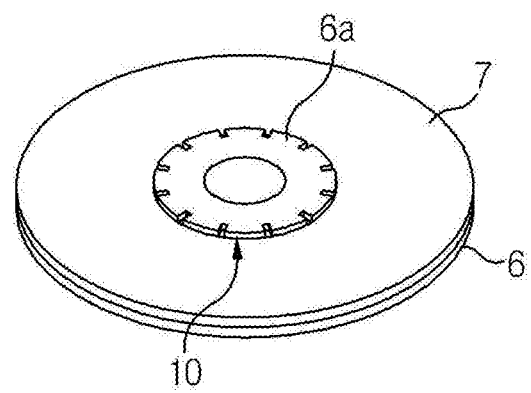
FIG. 3 is a perspective view illustrating the plate and the sensing magnet that are coupled.

Referring to FIG. 3, a periphery of a surface passed by the through hole (7a) of the sensing magnet (7) is preferably formed with magnet grip units (10) capable of physically gripping the sensing magnet (7), each at a predetermined gap. The magnet grip unit (10) is preferably deformed to grip the sensing magnet (7) by caulking a periphery of the magnet accommodation unit (6a) at a predetermined gap. That is, the caulking process is to generate a plastic deformed portion of the magnet accommodation unit (6a) of the plate (6) by applying a predetermined size of force to the magnet accommodation unit (6a), whereby the sensing magnet (7) can be physically gripped.

According to an exemplary embodiment of the present disclosure, the magnet grip unit (10) may be formed by caulking a total of 12 positions in the periphery of the magnet accommodation unit (6a) each at a 30-degree gap. Furthermore, the caulked magnet grip unit (10) is preferably formed with spots, each spot sized of approximately 1 mm to obtain a processing convenience. If an excessive broad area is caulked to form the magnet grip unit (10), the sensing magnet (7) may be damaged during the caulking process. As a result, as shown in FIG. 1, an upper side of the sensing magnet (7) is inhibited from being physically separated by the magnet grip unit (10) formed by the caulking.

As noted from the foregoing, in addition to the conventional chemical fixation using an adhesive, the magnet grip unit (10) is provided through a caulking process capable of physically gripping the sensing magnet (7), whereby it is possible to provide a stable coupled structure of the sensing magnet even in a long operation environment, particularly under a high temperature.

Particularly, a physical magnet fixing structure is provided by plastic deformation of a conventionally existing magnet accommodation unit (6a) of the plate (6) through the caulking process instead of using a separate sensing magnet fixing member, such that no additional parts expenses are required and no additional expenditure for material costs caused by increased number of parts is needed.

Figure 4:
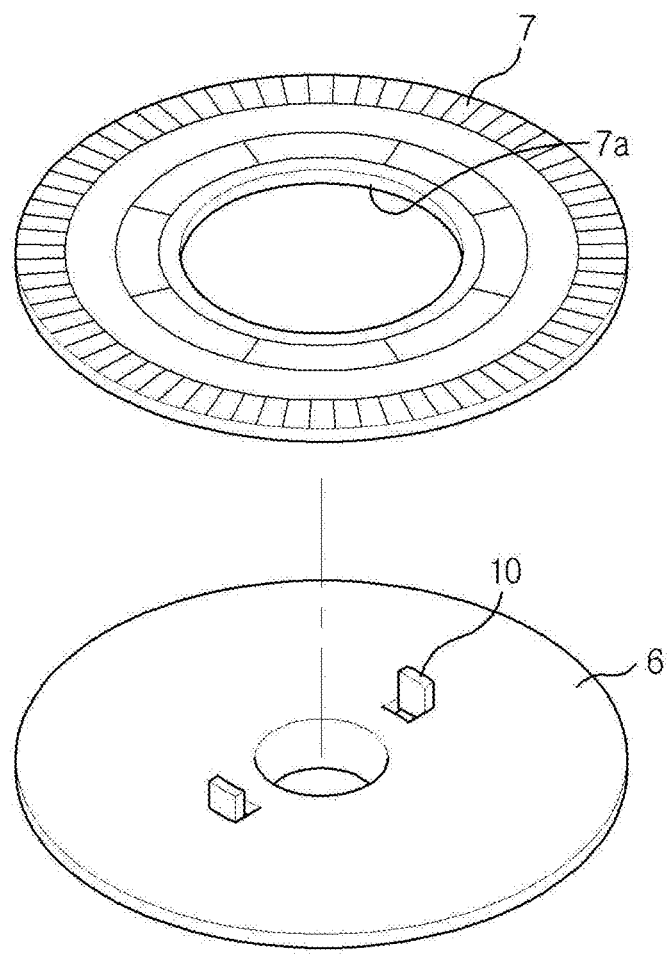
FIG. 4 is an exploded perspective view of the sensing magnet and the plate of FIG. 1 according a second exemplary embodiment of the present disclosure.

Referring to FIG. 4, the plate (6) according to a second exemplary embodiment of the present disclosure is provided in a disk shape, and a central vicinity coupled to the rotation shaft (3) is protrusively formed with a magnet grip unit (10) for inhibiting the sensing magnet (7) from separating. The configuration of the magnet grip unit (10) will be explained later.

The sensing magnet (7) is provided in a disk shape having an outmost diameter corresponding to a diameter of the plate (6). The sensing magnet (7) is centrally formed with a through hole (7a) of a predetermined diameter whereby the magnet grip unit (10) can be exposed near at the through hole (7a).

Meanwhile, a surface opposite to the sensing magnet (7) of the plate (6) is coated with an adhesive to initially fix the plate (6) to the sensing magnet (7). In addition to the adhesive, the plate (6) and the sensing magnet (7) may be adhered using a film member having an adhesive component such as a double-sided tape, if necessary.

Figure 5:
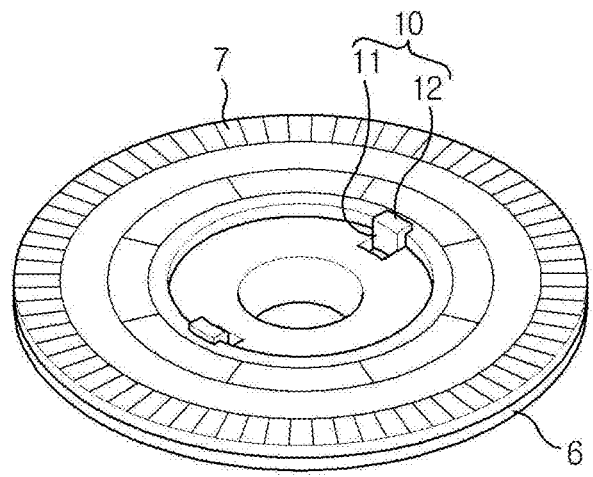
FIGS. 5 and 6 are perspective views illustrating a state in which the plate and the sensing magnet of FIG. 4 are coupled.
Figure 6:
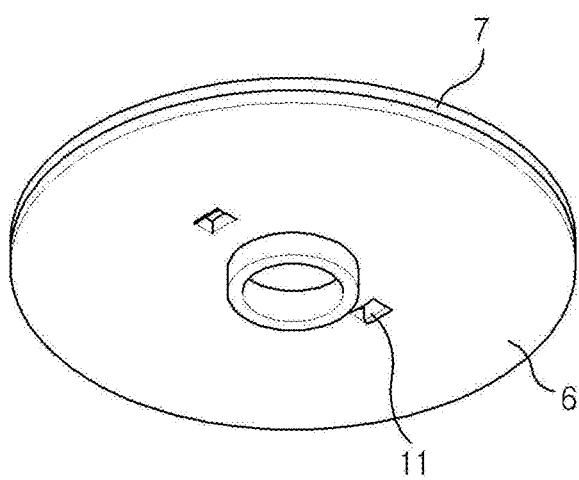

The magnet grip unit (10) includes a support rib (11) and a separation inhibition unit (12). The support rib (11) is protrusively formed at an upper surface of the plate (6), and as shown in FIGS. 4, 5 and 6, at least one pair of support ribs is provided. However, three or four support ribs may be protrusively formed if necessary. Although the support rib (11) is formed by preferably punching a portion of the plate (6) and bending a distal end of the punched portion, the method of forming the support rib (11) is not limited thereto, it should be apparent that the plate (6) may be protrusively formed by molding.

Meanwhile, a length of the support rib (11) is greater than a thickness of the sensing magnet (7), such that more than a predetermined length of the support rib (11) can be protruded upwards of the sensing magnet (7), in a case the sensing magnet (7) is inserted while the support rib (11) is erect.

The separation inhibition unit (12) is such that a distal end of the support rib (11) is bent to surface-contact an upper surface of the sensing magnet (7). Preferably, in order to allow the lug-shaped erect support rib (11) to support an inner circumferential surface of the through hole (7a) of the sensing magnet (7), the sensing magnet (7) is coupled to an upper surface of the plate (6), a press is used to depress a distal end of the support rib (11) to allow the separation inhibition unit (12) to surface-contact the upper surface of the sensing magnet (7), as shown in FIGS. 1 and 5. As a result, the upper surface of the sensing magnet (7) is inhibited from physical separation by the magnet grip unit (10) formed by caulking.

As noted from the foregoing, in addition to the conventional chemical fixation using an adhesive, the magnet grip unit (10) is provided through a caulking process capable of physically gripping the sensing magnet (7), whereby it is possible to provide a stable coupled structure of the sensing magnet even in a long operation environment, particularly under a high temperature.

Particularly, apart from employing a separate sensing magnet (7), the conventionally used magnet grip unit (10) is formed with the plate (6), the sensing magnet (7) is accommodated on the upper surface of the plate (6), a press is used to plastic-deform a distal end of the support rib (11), to form the separation inhibition unit (12) and to provide a physical magnet fixing structure using the separation inhibition unit (12), whereby no additional parts are consumed, and no additional material expenditure caused by increased number of parts is needed.

Figure 7:
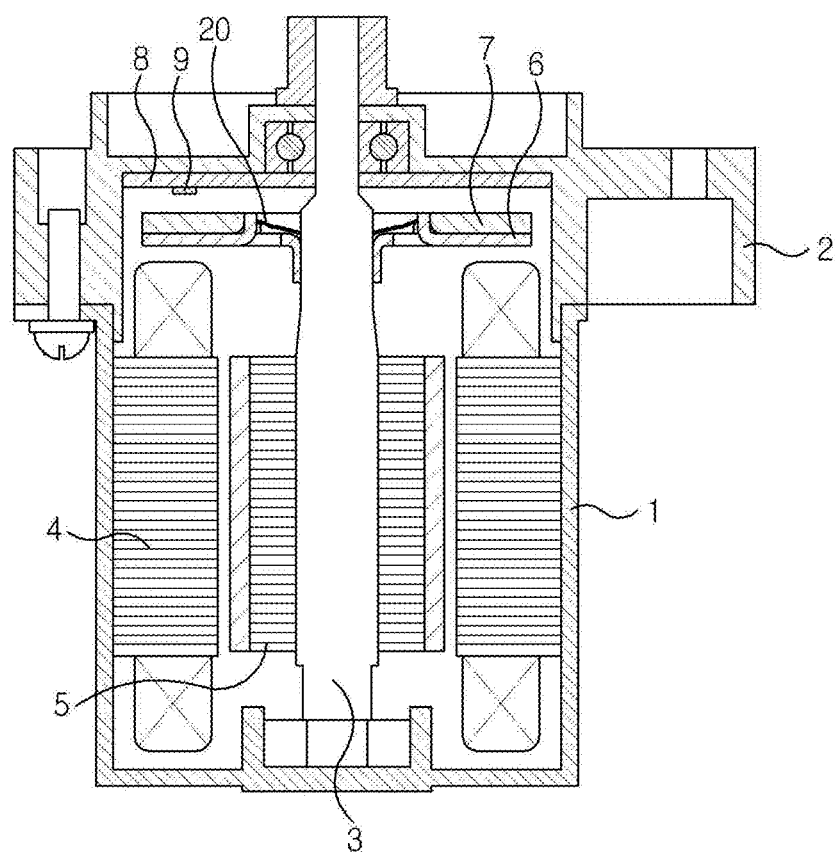
FIG. 7 is a schematic cross-sectional view illustrating an EPS motor according to a third exemplary embodiment of the present disclosure.

FIG. 7 is a schematic cross-sectional view illustrating an EPS motor according to a third exemplary embodiment of the present disclosure.

Referring to FIG. 7, the EPS motor according to the present disclosure includes a housing (1) and a cover member (2) coupled to an upper surface of the housing (1), combination of which forms an external look of the motor.

The housing (1) is formed at an inner circumferential surface with a stator (4) wound with a plurality of coils, and the stator (4) is centrally formed with a rotor (5) rotatable by a rotation shaft (3). A rotor core of the rotor (5) may be coupled with a magnet, or the rotor core and a magnet may be integrally formed. The rotor (5) is formed at an upper surface with a sensing magnet (7) coupled to a plate (6) for obtaining position information of the rotor (5).

Figure 8:
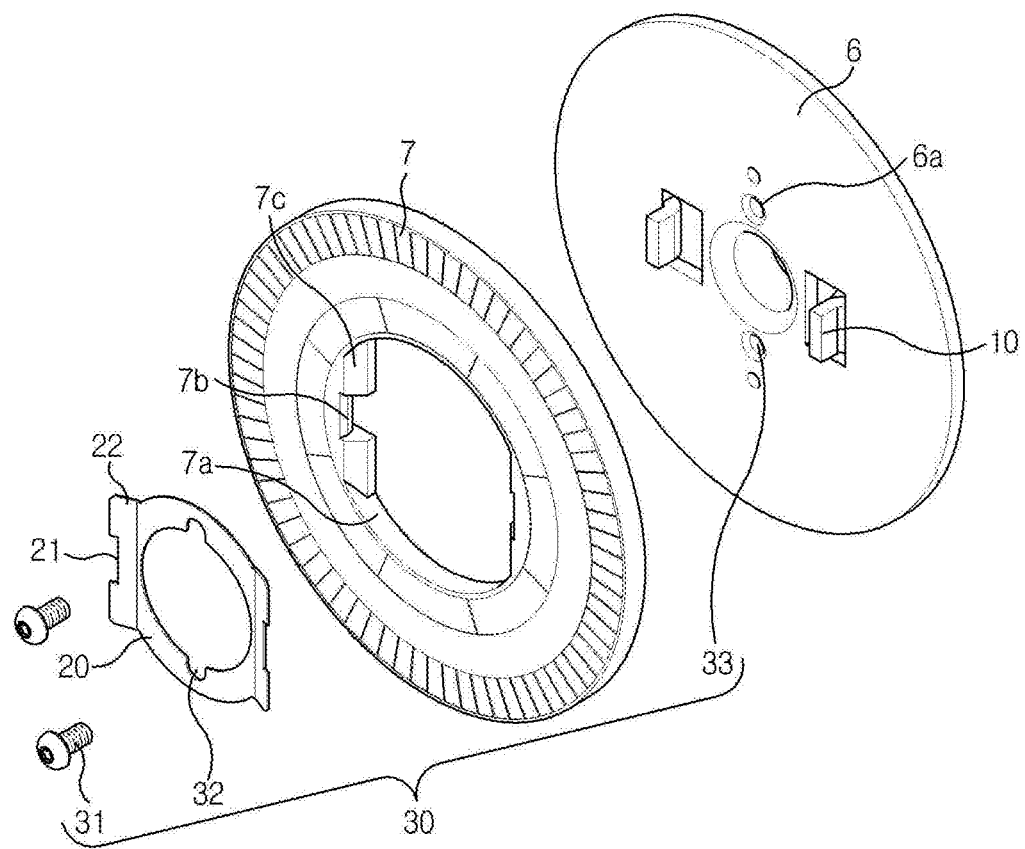
FIG. 8 is an exploded perspective view of a sensing magnet and a plate according a third exemplary embodiment of the present disclosure.

Referring to FIG. 8, the plate (6) is provided in a disk shape and a central vicinity coupled to the rotation shaft (3) is protrusively formed with a magnet support rib (10) to inhibit the sensing magnet (7) from separating. The sensing magnet (7) is provided in a disk shape having an outmost diameter corresponding to a diameter of the plate (6), and centrally formed with a through hole (7a), where an inner circumferential surface of the through hole (7a) is supported by the magnet support rib (10), the detailed configuration of which will be provided later.

Meanwhile, a surface opposite to the sensing magnet (7) of the plate (6) is coated with an adhesive to initially fix the plate (6) to the sensing magnet (7). In addition to the adhesive, the plate (6) and the sensing magnet (7) may be adhered using a film member having an adhesive component such as a double-sided tape, if necessary.

The sensing magnet (7) is mounted at an upper surface thereof with a magnetic element (9) to face the sensing magnet (7). The magnetic element (9) is mounted on a PCB (Printed Circuit Board) fixed at an inner circumferential surface of the cover member (2). At this time, the magnetic element (9) is preferably provided in a Hall IC.

The characteristic of the present disclosure is a coupling relationship between the plate (6) and the sensing magnet (7), and the anti-separating structure of sensing magnet for EPS motor according to an exemplary embodiment of the present disclosure further includes a magnet support rib (10), a holder member (20) and a fixing unit (30).

Figure 9:
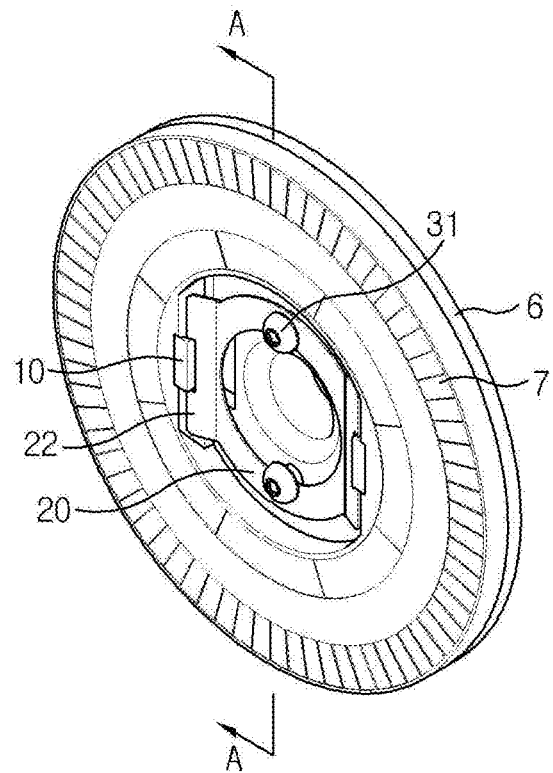
FIG. 9 is a perspective view illustrating coupled state of FIG. 8.
Figure 10:
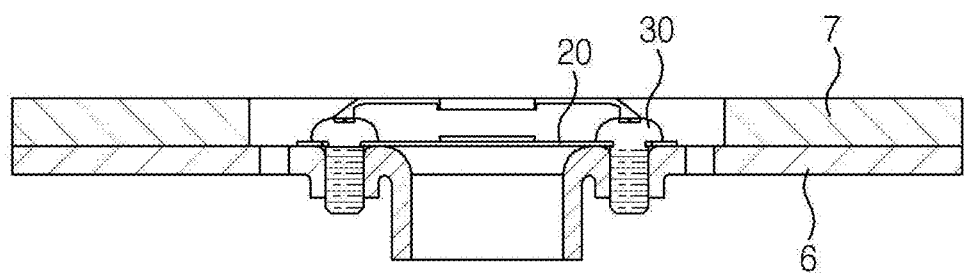
FIG. 10 is a cross-sectional view taken along line A-A of FIG. 8.

The magnet support rib (10) is protruded towards an upper surface of the plate (6), and at least a pair of magnet support ribs (10) is preferably provided, as shown in FIGS. 8, 9 and 10. If necessary, three or four magnet support ribs (10) may be protrusively formed.

Although the magnet the support rib (10) is formed by preferably punching a portion of the plate (6) and bending a distal end of the punched portion, the method of forming the magnet support rib (10) is not limited thereto, it should be apparent that the plate (6) may be protrusively formed by molding.

Meanwhile, a length of the magnet support rib (10) is greater than a thickness of the sensing magnet (7), such that more than a predetermined length of the magnet support rib (10) can be protruded upwards of the sensing magnet (7), in a case the sensing magnet (7) is inserted while the magnet support rib (10) is erect.

Referring to FIGS. 8 and 9, the magnet support rib (10) supports a first support surface (7b) formed at an inner circumferential surface of the through hole (7a) of the sensing magnet (7). At this time, the first support surface (7b) is formed at the inner circumferential surface of the through hole (7a) in a shape of a concave portion corresponding to that of the magnet support rib (10) a concave portion.

A second support surface (7c) is formed across the first support surface (7b). The second support surface (7c) is more protruded than the first support surface (7b). However, as shown in the figures, the second support surface (7c) is provided with a surface having a sliding slant to surface-contact a magnet support surface (22) provided at the holder member (20, described later), whereby the sensing magnet (7) is inhibited from separating.

The holder member (20) is coupled to an upper side of the sensing magnet (7) to inhibit the sensing magnet (7) from separating from the plate (6). The holder member (20) is secured to the plate (6) by the fixing unit (30). The holder member (20) is provided in a thin metal plate of an elastic material to be elastically deformed when fastened to a fastening member (30, described later), where the sensing magnet (7) can be depressed by elastic restoring force of the holder member (20).

The holder member (20) includes a rib groove (21) supporting a lateral surface of the magnet support rib (10), and a magnet support surface (22), and is centrally formed with a void space through which the plate (6) is exposed.

The rib groove (21) supports the other surface of the magnet support rib (10) surface-contacting the first support surface (7b), and is formed to have a shape of a concave portion corresponding to that of the magnet support rib (10) like the first support surface (7b). The rib groove (21) is preferably formed at a position opposite to the magnet support rib (10) of the holder member (20), such that in a case a pair of magnet support ribs (10) is provided, it is preferred that the rib groove (21) be also provided in a pair.

The magnet support surface (22) serves to surface-contact the second support surface (7c) and it is preferred that the magnet support surface (22) be formed across the rib groove (21) as wings of a body of the holder member (20).

That is, as shown in the figures, the rib groove (21) may be formed in the shape of a concave groove relative to the magnet support surface (22). The magnet support surface (22) is provided in a bent shape at a predetermined angle relative to the body of the holder member (20), such that the sensing magnet (7) can be depressed and secured to the plate (6) side when fastened by the fixing unit (30, described later).

As mentioned above, the magnet support surface (22) serves to surface-contact the second support surface (7c) of the sensing magnet (7) to inhibit the sensing magnet (7) from separating from the plate (6).

The present disclosure provides a total of three exemplary embodiments that are classified according to configuration of the fixing unit (30), details of which is provided hereunder.

In a third exemplary embodiment of the present disclosure, the fixing unit (30) includes a fastening screw (31) fastened to a second through hole (33) penetratively formed at the plate (6) after passing through a first through hole (32) penetratively formed at the holder member (20). At this time, the first through hole (32), as shown in FIG. 2, may communicate with a central space of the holder member (20).

Referring to FIGS. 9 and 10, the configuration thus mentioned can inhibit the sensing magnet (7) from separating because the holder member (20) is fastened to the plate (6) by the fastening screw (31).

Figure 11:
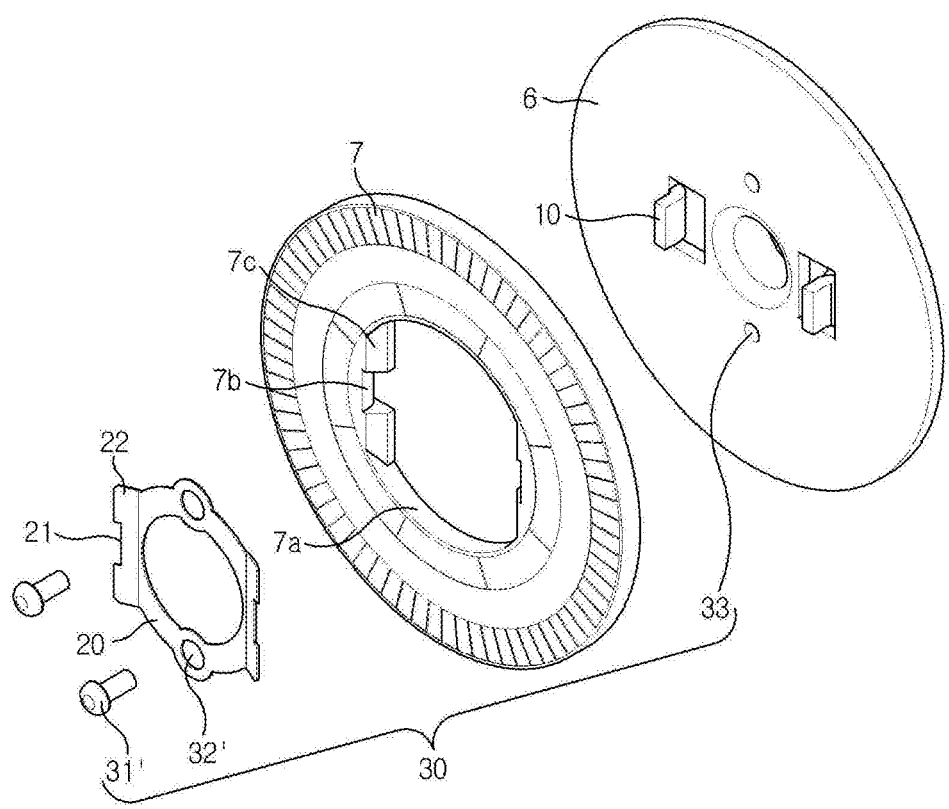
FIG. 11 is an exploded perspective view of a sensing magnet and a plate according a fourth exemplary embodiment of the present disclosure.
Figure 12:
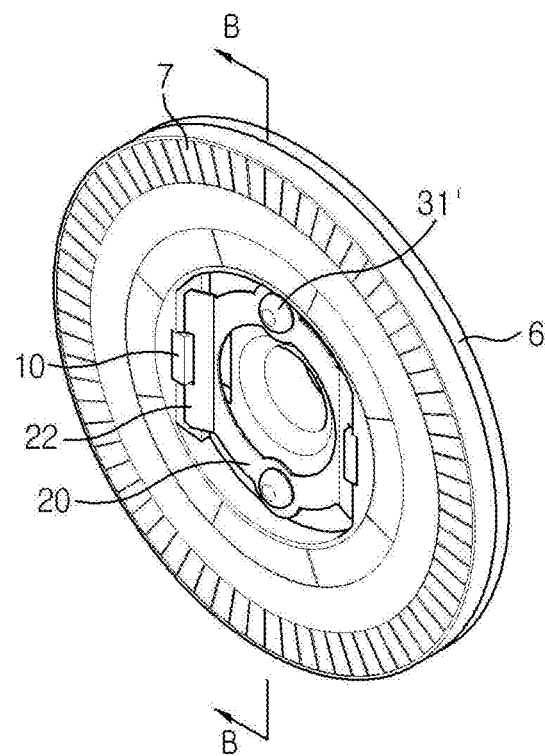
FIG. 12 is a perspective view illustrating coupled state of FIG. 11.
Figure 13:
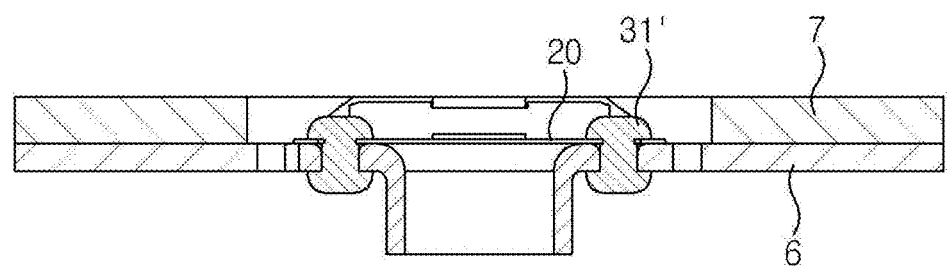
FIG. 13 is a cross-sectional view taken along line B-B of FIG. 12.

Referring to FIGS. 11, 12 and 13, and in comparison with the third exemplary embodiment of the present disclosure, the fixing unit (30) according to a fourth exemplary embodiment of the present disclosure is such that the fastening screw (31) is replaced with a rivet (31'), and the first through hole (32) penetratively formed in a groove shape in the first exemplary embodiment is replaced with a first through hole (32') formed in a penetrative round through hole as shown in FIG. 5 to secure the holder member (20) in a sturdier manner than that of a head of the rivet (31').

According to the rivet coupling based on the second exemplary embodiment of the present disclosure, there happens no problem of letting the holder member (20) separate from the plate (6) due to the loosened screw fastening during a long time of use.

Figure 14:
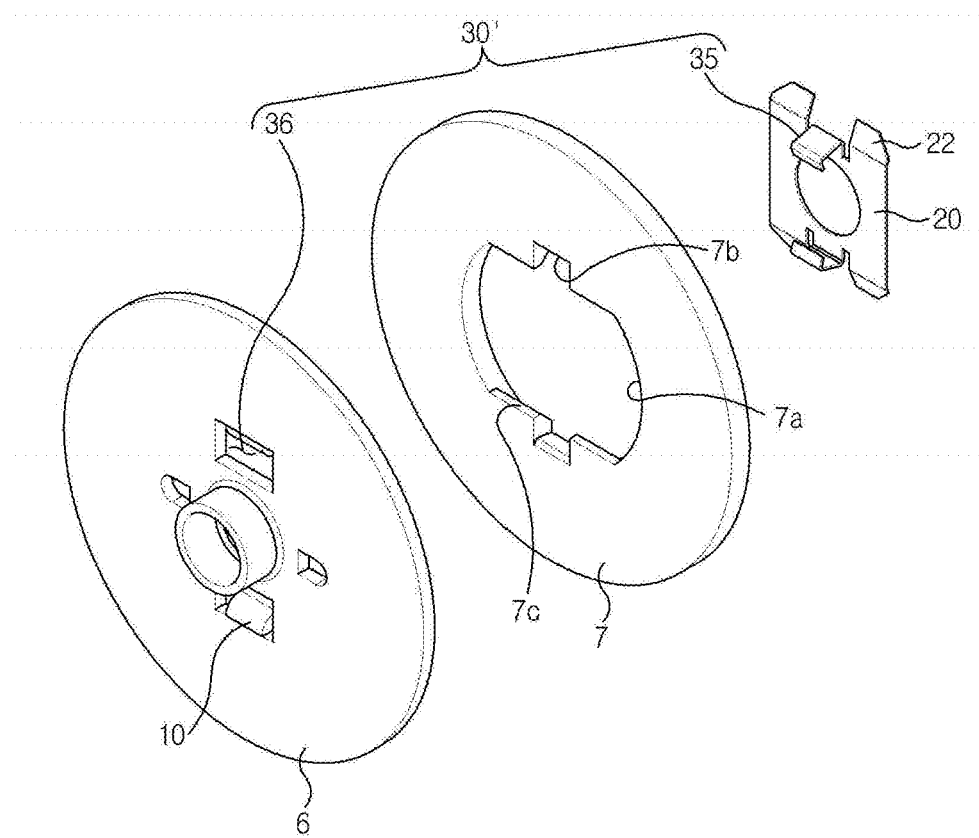
FIG. 14 is an exploded perspective view of a sensing magnet and a plate according a fifth exemplary embodiment of the present disclosure.
Figure 15:
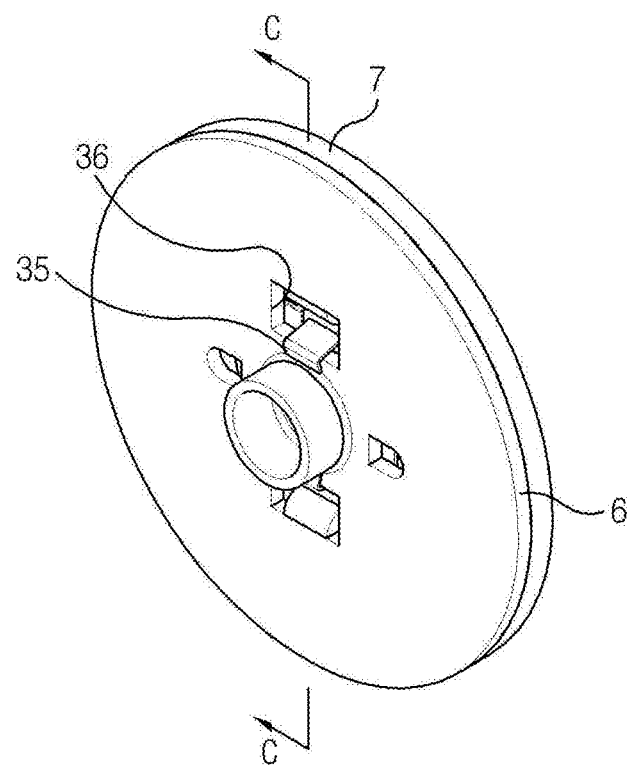
FIG. 15 is a perspective view illustrating coupled state of FIG. 14.
Figure 16:
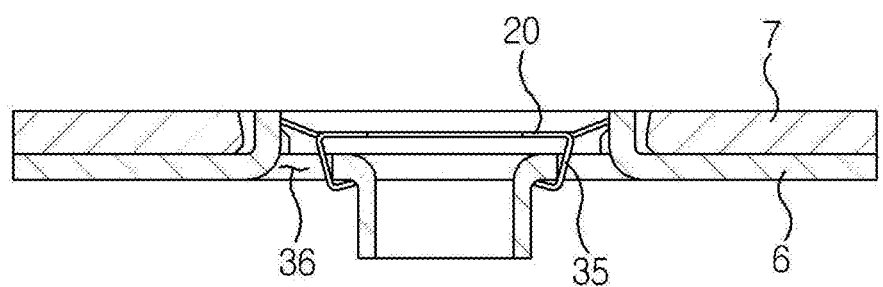
FIG. 16 is a cross-sectional view taken along line C-C of FIG. 15.

Meanwhile, referring to FIGS. 14, 15 and 16, a fastening unit (30') according to a fifth exemplary embodiment of the present disclosure includes a hook (35) integrally formed with the holder member (20) and a hitching unit (36), unlike the fastening screw (31) or the rivet (31') as in the third and fourth exemplary embodiments of the present disclosure.

The hook (35) is integrally formed with the holder member (20) and is protrusively formed toward the plate (6) from the holder member (20). The hook (35) is preferably formed by bending a portion extended to a direction of the other side of the magnet support surface (22) from the rib groove (21) of the holder member (20) as shown in FIGS. 14, 15 and 16. As a result, the rib groove (21) surface-contacting the magnet support rib (10) in the third and fourth exemplary embodiments of the present disclosure becomes a bending point of the hook (35) that no more supports the magnet support rib (10) in the fifth exemplary embodiment of the present disclosure.

The hitching unit (36) may be provided in a separate through hole, but it is preferred that a portion penetratively formed at the plate (6) be used as the hitching unit (36) for formation of the magnet support rib (10) as illustrated in FIGS. 15 and 16.

According to the abovementioned configuration and as depicted in FIG. 16, the holder member (20) can fix and hook the integrally formed hook (35) to the hitching unit (36) without recourse to a separate fastening member such as the fastening screw (31) or the rivet (31') as described in the first and second exemplary embodiments of the present disclosure.

As noted from the foregoing, in addition to the conventional chemical fixation using an adhesive, the holder member (20) can be fixed using various types of fixing units (30) capable of physically gripping the sensing magnet (7), whereby it is possible to provide a stable coupled structure of the sensing magnet even in a long operation environment, particularly under a high temperature.

Figure 18:
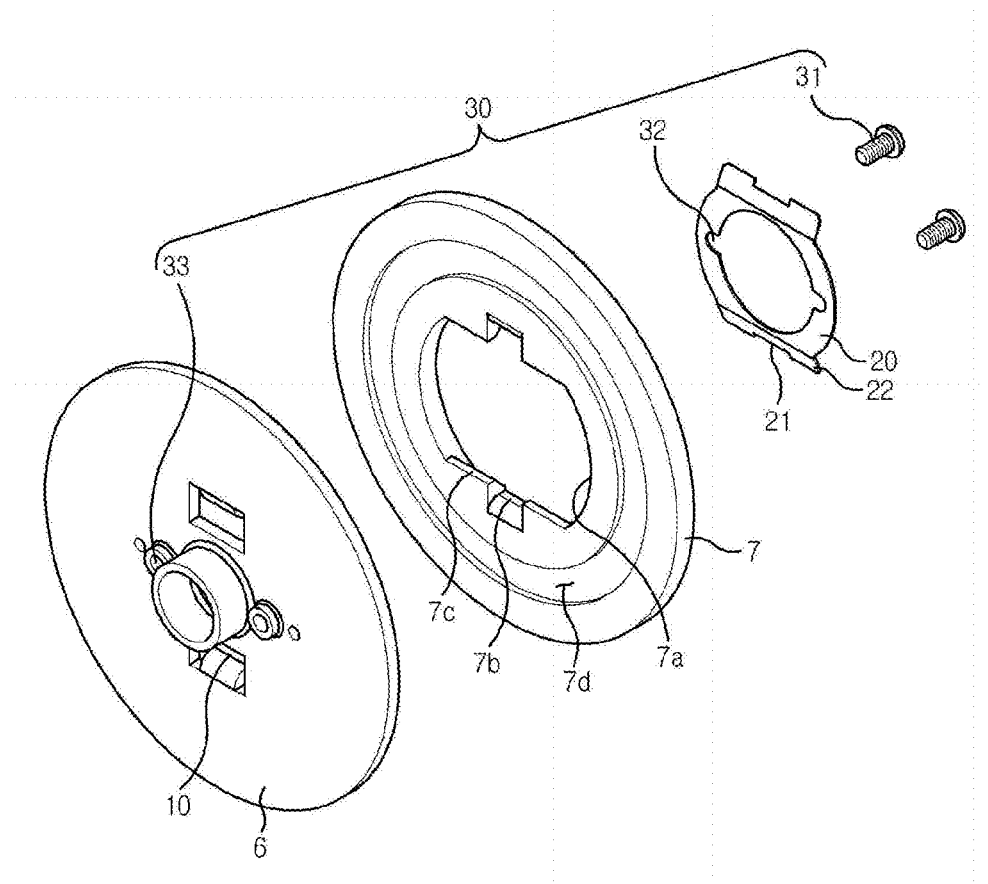
Figure 19:
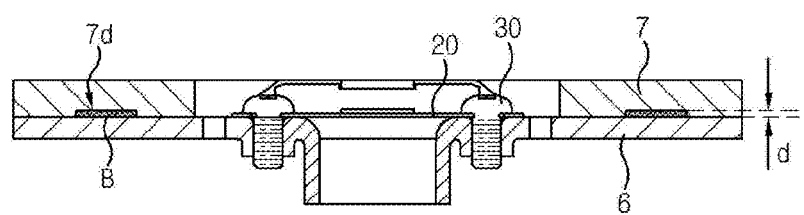
FIG. 19 is a cross-sectional view taken along line D-D of FIG. 18.

Meanwhile, according to a sixth exemplary embodiment of the present disclosure, an adhesive accommodation groove (7d) may be formed at a predetermined depth on a surface opposite to the plate (6) of the sensing magnet (7). The adhesive accommodation groove (7d) is provided in a shape of a ring having a diameter smaller than that of the sensing magnet (7) as shown in FIG. 18, and as illustrated in the cross-sectional view of FIG. 19, the adhesive accommodation groove (7d) is preferably formed with a predetermined depth (d), preferably not exceeding 0.05 mm. If the depth (d) is too deep, strength of the sensing magnet (7) may be weakened to increase an amount of injected adhesive.

Figure 17:
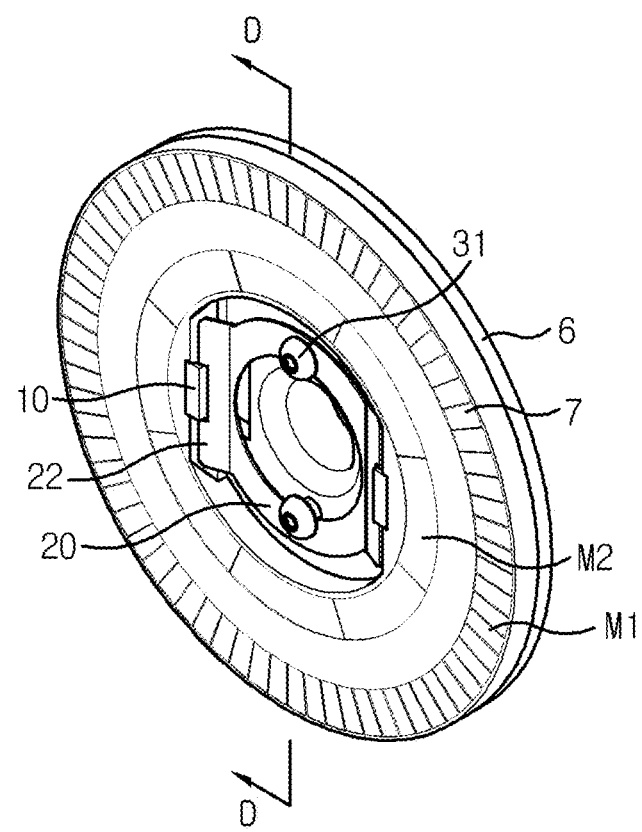
FIGS. 17 and 18 are perspective view and an exploded perspective view of a sensing magnet and a plate according to a sixth exemplary embodiment of the present disclosure.

Meanwhile, the adhesive accommodation groove (7d) may be so arranged as to inhibit a formed position of a main magnet (M1) from interfering with a formed position of a sub magnet (M2), as depicted in FIG. 17, such that magnetized patterns of the main and sub magnets (M1, M2) are not affected.

In a case the adhesive accommodation groove (7d) is formed at the sensing magnet (7), there is no need of performing a pressing process of spreading an adhesive to a surface opposite to the plate (6) of the sensing magnet (7) to dispense with the fear of damaging the sensing magnet (7) in the pressing process, and to reduce the manufacturing cost as a constant amount of adhesive can be used at all times.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An anti-separating structure of a sensing magnet for an EPS motor, the structure comprising:
   a disk-shaped plate into which a rotation shaft is centrally inserted;
   a ring-shaped sensing magnet centrally formed with a through hole and coupled to an upper side of the plate, wherein a periphery of the through hole includes an arc portion and an irregular portion;
   a holder member centrally formed with a void space and insertably coupled to an upper side of the sensing magnet through the through hole; and
   a fixing unit fixing the holder member coupled to the sensing magnet to the plate;
   wherein the sensing magnet is formed with a first support surface at a middle of the irregular portion at a the periphery of the through hole and a second support surface formed across the first support surface at the irregular portion;
   wherein each of the first and second support surfaces is provided in a pair facing each other and symmetrically formed relative to a center of the sensing magnet,
   wherein at least a pair of magnet support ribs is protruded from the plate toward the sensing magnet to grip the first support surface of the sensing magnet such that the magnet support rib supports the first support surface of the sensing magnet,
   wherein the holder member includes a magnet support surface configured to be disposed at both sides of the magnet support rib and surface-contacts the second support surface of the sensing magnet,
   wherein the holder member further includes a pair of rib grooves formed at a middle portion of the magnet support surface supporting a lateral surface of the magnet support ribs, respectively,
   wherein the second support surface of the sensing magnet is formed with a slant surface of a predetermined area to allow surface-contacting with the magnet support surface of the holder member, and
   wherein the magnet support rib is disposed between the first support surface and the rib groove.

2. The structure of claim 1, wherein the fixing unit includes a fastening member coupled to a second through hole penetratively formed at the plate after passing through a first through hole penetratively formed at the holder member.

3. The structure of claim 2, wherein the fastening member includes any one of a screw and a rivet.

4. The structure of claim 2, wherein a distance from a center of the plate to the second through hole is smaller than a radius of the through hole of the sensing magnet with respect to the center of the sensing magnet.

5. The structure of claim 2, wherein the holder member is provided in a thin metal plate of an elastic material to be elastically defotmed when fastened to the fastening member and covers a portion surrounding the through hole.

6. The structure of claim 2, wherein the first through hole is formed concavely in a radial direction with respect to the a center of the holder member and to communicate with a central space of the holder member.

7. The structure of claim 1, wherein the fixing unit includes a hook integrally formed with the holder member and protrusively formed from the holder member toward the plate, and a hitching unit penetratively formed at a position corresponding to the hook of the plate.

8. The structure of claim 1, wherein the second support surface is disposed on both sides of the first support surface and protrudes toward the center of the sensing magnet.

9. The structure of claim 1, wherein an outer diameter of the sensing magnet with respect to the center of the sensing magnet corresponds to an outer diameter of the plate.

10. The structure of claim 1, wherein the plate is adhered to the sensing magnet with a film member having an adhesive component.

11. The structure of claim 1, wherein each magnet support rib is formed by punching a portion of the plate and bending a distal end of the punched portion.

12. The structure of claim 1, wherein each magnet support rib is protrusively formed by molding.

13. The structure of claim 1, wherein each first support surface is formed in a shape of a concave portion corresponding to a shape of the magnet support rib.

14. The structure of claim 1, wherein each rib groove is formed at a position opposite to at least a pair of magnet support ribs of the plate.

15. The structure of claim 1, wherein the magnet support surface is provided in a bent shape at a predetermined angle relative to a body of the holder member.

* * * * *